United States Patent
Rosemeier

(10) Patent No.: US 9,074,639 B2
(45) Date of Patent: Jul. 7, 2015

(54) POSITIVE SHIFTING DEVICE, IN PARTICULAR A GUIDED MANUAL TRANSMISSION

(75) Inventor: Thomas Rosemeier, Meckenbeuren (DE)

(73) Assignee: ZF Friedrichshafen AG, Friedrichshafen (DE)

(*) Notice: Subject to any disclaimer, the term of this patent is extended or adjusted under 35 U.S.C. 154(b) by 522 days.

(21) Appl. No.: 13/512,667

(22) PCT Filed: Nov. 29, 2010

(86) PCT No.: PCT/EP2010/068394
§ 371 (c)(1),
(2), (4) Date: May 30, 2012

(87) PCT Pub. No.: WO2011/069853
PCT Pub. Date: Jun. 16, 2011

(65) Prior Publication Data
US 2012/0234644 A1    Sep. 20, 2012

(30) Foreign Application Priority Data
Dec. 10, 2009 (DE) .......................... 10 2009 054 459

(51) Int. Cl.
*F16D 23/10* (2006.01)
*F16D 11/14* (2006.01)
*F16D 11/00* (2006.01)

(52) U.S. Cl.
CPC ................ *F16D 11/14* (2013.01); *F16D 23/10* (2013.01); *F16D 2011/008* (2013.01)

(58) Field of Classification Search
CPC .............. F16D 23/10; F16D 2500/304; F16D 2500/30408; F16D 2500/50607; F16D 2011/002; F16D 2011/004; F16D 2011/008; F16D 2300/18
See application file for complete search history.

(56) References Cited

U.S. PATENT DOCUMENTS 2,427,641 A * 9/1947 Wildhaber ...................... 409/51
5,044,481 A   9/1991 Yoshida et al.
(Continued)

FOREIGN PATENT DOCUMENTS

| DE | 34 46 430 A1 | 7/1986 |
| DE | 197 11 971 A1 | 9/1998 |
| DE | 199 15 200 A1 | 10/2000 |
| DE | 10 2004 003 287 A1 | 8/2004 |

(Continued)

OTHER PUBLICATIONS

Chinese Office Action issued in corresponding Chinese Application No. 201080056251.1 mailed Oct. 24, 2014.

*Primary Examiner* — Huan Le
(74) *Attorney, Agent, or Firm* — Davis & Bujold, P.L.L.C.; Michael J. Bujold

(57) ABSTRACT

A positively interlocking shifting device, in particular a claw shifting device for a vehicle transmission. The shifting device comprises at least a first clutch element (1) and a second, axially displaceable clutch element (2). For the interlocking engagement of the corresponding claws (3, 4) of the first and second clutch elements (1, 2), the axially displaceable clutch element (2) can be shifted as soon as a predetermined speed difference, between the two clutch elements (1, 2), is reached. At least one detection device is provided for detecting an offset position between the corresponding claws (3, 4) of the first and the second clutch elements (1, 2), as required for engagement.

12 Claims, 3 Drawing Sheets

(56) References Cited

U.S. PATENT DOCUMENTS

| | | | |
|---|---|---|---|
| 5,109,969 A * | 5/1992 | Blaser | 192/103 R |
| 6,065,898 A | 5/2000 | Hale | |
| 6,244,413 B1 | 6/2001 | Gutmann et al. | |
| 7,152,720 B2 * | 12/2006 | Claussen et al. | 192/30 W |
| 2003/0106766 A1 * | 6/2003 | Johnson et al. | 192/103 R |
| 2011/0099994 A1 | 5/2011 | Reisch et al. | |

FOREIGN PATENT DOCUMENTS

| | | |
|---|---|---|
| DE | 10 2008 001 196 A1 | 10/2009 |
| EP | 0 149 387 A2 | 7/1985 |
| EP | 1 256 743 A1 | 11/2002 |
| FR | 2 887 604 A1 | 12/2006 |
| JP | 58-152936 A | 9/1983 |
| JP | 2009222105 A | 10/2009 |

\* cited by examiner

US 9,074,639 B2

POSITIVE SHIFTING DEVICE, IN PARTICULAR A GUIDED MANUAL TRANSMISSION

This application is a National Stage completion of PCT/EP2010/068394 filed Nov. 29, 2010, which claims priority from German patent application serial no. 10 2009 054 459.3 filed Dec. 10, 2009.

FIELD OF THE INVENTION

The present invention concerns a positive shifting device, in particular a guided manual transmission for a vehicle transmission.

BACKGROUND OF THE INVENTION

Positively interlocking shifting devices, such as claw shifting devices or the like, are known from automotive technology. With claw shifting devices a shifting operation initiates an engagement process for the interlocked connection of the meshing claws. However, the engagement process can only begin when a predetermined speed difference range is reached. It has been shown that during this, so-termed tooth-on-tooth positions of the corresponding claws can occur, such that the meshing claws jam against one another so that the engagement process has to be interrupted until the tooth-on-tooth position has been eliminated. It is then necessary to store the shifting energy applied intermediately. This results in actuation systems of unnecessarily complex design, and in non-reproducible dynamics during shifting.

SUMMARY OF THE INVENTION

The purpose of the present invention is to propose a positive interlocking shifting device of the type indicated at the start, with which a tooth-on-tooth position during an engagement process is avoided as much as possible.

Accordingly a positive interlocking shifting device is proposed, in particular a claw shifting device for a vehicle transmission, which comprises at least a first clutch element or claw shifting element and a second, axially displaceable clutch element, wherein for the interlocked engagement of the claws the axially displaceable clutch element or shifting sleeve can be shifted when the speed difference between the two clutch elements has reached a predetermined value, and wherein at least one detection device in provided for detecting a position offset between the corresponding claws of the two clutch elements, which is required during the engagement process in order to avoid a tooth-on-tooth position of the claws. In this way a position-controlled and speed-controlled claw shifting device is obtained.

It is also possible for other positively interlocking shifting devices to be provided with the detection device. For example, instead of claws, interlocking connectors of different design can be used.

Advantageously, with the proposed claw shifting device an undesired tooth-on-tooth position can be avoided by carrying out the engagement process in a manner that depends on the position offset between the corresponding claws and as a function of the differential speed. This means that the engagement process only begins when the position offset precludes any tooth-on-tooth position of the claws and when the speed difference between the two elements of the clutch is as required.

In a first further development of the invention it can be provided that as the detection device at least one Hall sensor or the like is fitted, such that the alternating current fraction of the signals emitted by the sensor gives a measure of the overlap of the claws. This means that as the alternating current fraction decreases, so too does the overlap, so that the corresponding claws are moving away from one another. In this situation the engagement process can take place without problems. Preferably a Hall sensor of appropriately wide design can be used, which can detect the claws of both clutch elements. It is also possible for the claws of each clutch element to be associated with a separate Hall sensor.

It is also conceivable that as the detection device, an optical sensor or the like with a light source for detecting position offsets between the claws is provided. For example, the light source can be arranged in such manner that a light beam traveling at least in part in the engagement direction in the area of the claws is emitted, and relative to the light beam direction the claws at the front are for example made light-absorbing while the rear claws are light-reflecting. For example, if the width of the light beam emitted corresponds to the width of a claw plus the width of a gap between two adjacent claws, then with reference to the reflected light beam it can be recognized by the sensor when the corresponding claws are moving apart so that the engagement process can begin. For this, the reflected light beam can be summed by the optical sensor. The path of the light beam can be varied as desired by at least one mirror or the like.

Possibly, the positions of the corresponding claws can be detected not on the claws themselves, but on corresponding replacement elements whose rotational speeds are coupled with those of the claws. If there is any positional ambiguity, speed signals from one of the clutch element shafts involved can also be used for a clear determination of position.

Regardless of whether a Hall sensor or an optical sensor is used as the detecting device, the speed difference can be derived with reference to the relative positions of the claws. In this way, by means of the detection device both the position offset and the speed difference can be determined so that at a suitable point in time the actuation can be initiated, for example electromagnetically or in some similar way, so that the claws come together at the correct differential speed and in the correct relative position for engagement. Furthermore, after initiating the engagement process the exact axial position of the axially displaceable clutch element or shifting sleeve can be determined and deviations from the desired path can be corrected. This can be done either by actuating the clutch element, for example in the case of actuation by an electric motor by means of a position or speed regulator, or alternatively by means of a controllable brake or an electric motor on one of the shafts of the clutch elements concerned.

In another advantageous version of the present invention it can be provided that the engagement behavior is farther improved by appropriate geometrical design at least of the claw contact geometries. For this, the claw geometry can be rounded off in such manner that the shape reflects approximately the ballistic path of a successful engagement process. In this way, in the event of any deviation from the optimum engagement path, only slight impacts will occur.

BRIEF DESCRIPTION OF THE DRAWINGS

Below, the present invention is explained further with reference to the drawings, which show.

DETAILED DESCRIPTION OF THE PREFERRED EMBODIMENTS

The figures show examples of various embodiment variants of a claw shifting device according to the invention. The claw shifting device for a vehicle transmission comprises a first rotating claw shifting element or clutch element 1 and a second, rotating and axially displaceable claw shifting element or clutch element 2, each having a plurality of claws 3, 4 or the like distributed around their circumference for mutual engagement with interlock. Associated with the clutch elements 1, 2 are usually a shaft in each case, whereby in the engaged condition the respective shafts (not shown) are brought into functional connection with one another by the clutch elements 1, 2.

According to the invention, it is now envisaged that at least one detection device is provided for detecting a position offset between corresponding claws 3, 4 of the two clutch elements 1, 2, as required in order to exclude a tooth-on-tooth position. In this way, when the position offset and the speed difference between the two clutch elements 1, 2 are both correct, the engagement process can be initiated.

Figure 1:
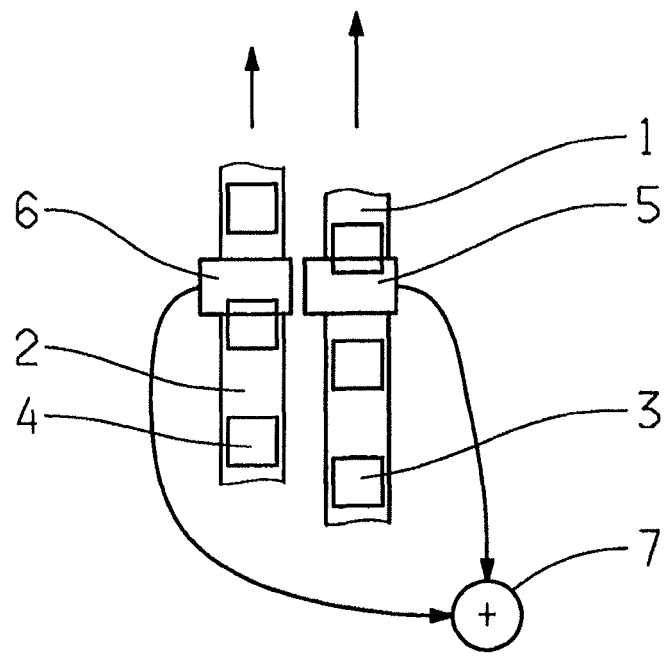
FIG. 1: A schematic view from above, of a claw shifting device according to the invention with Hall sensors as the detection device.

In FIG. 1, as the detection device two Hall sensors 5, 6 are provided, each Hall sensor 5, 6 being respectively associated with the claws 3, 4 of one of the two clutch elements 1, 2. The signals from the Hall sensors are summed in an evaluation unit 7 associated with the two sensors 5, 6 and the respective alternating current fraction of the signals gives a measure of the overlap of the claws 3, 4 concerned. This means that the smaller the alternating current fraction, the more the corresponding claws 3, 4 have moved apart. The speed difference between the clutch elements 1, 2 can be determined from their relative positions; in FIG. 1 the rotational movement of the clutch elements is indicated by arrows.

Figure 2:
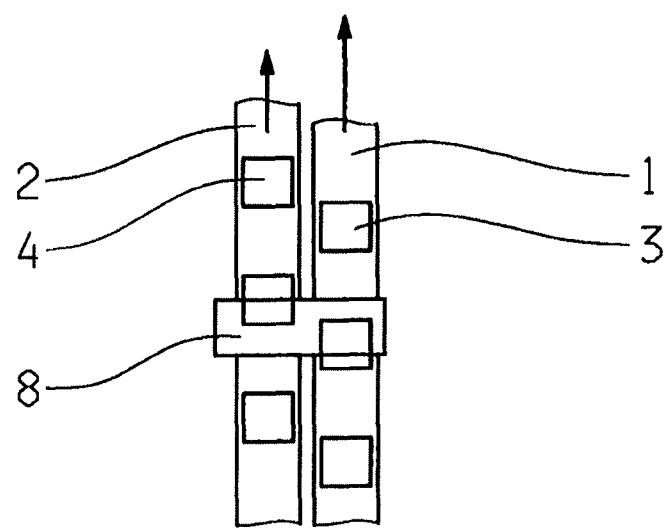
FIG. 2: A schematic view from above, of a differently designed claw shifting device as in FIG. 1.

FIG. 2 shows an alternative embodiment in which, otherwise than in the embodiment described above, a common Hall sensor 8 is provided which is associated with the claws 3, 4 of both clutch elements 1, 2 at the same time.

Figure 3:
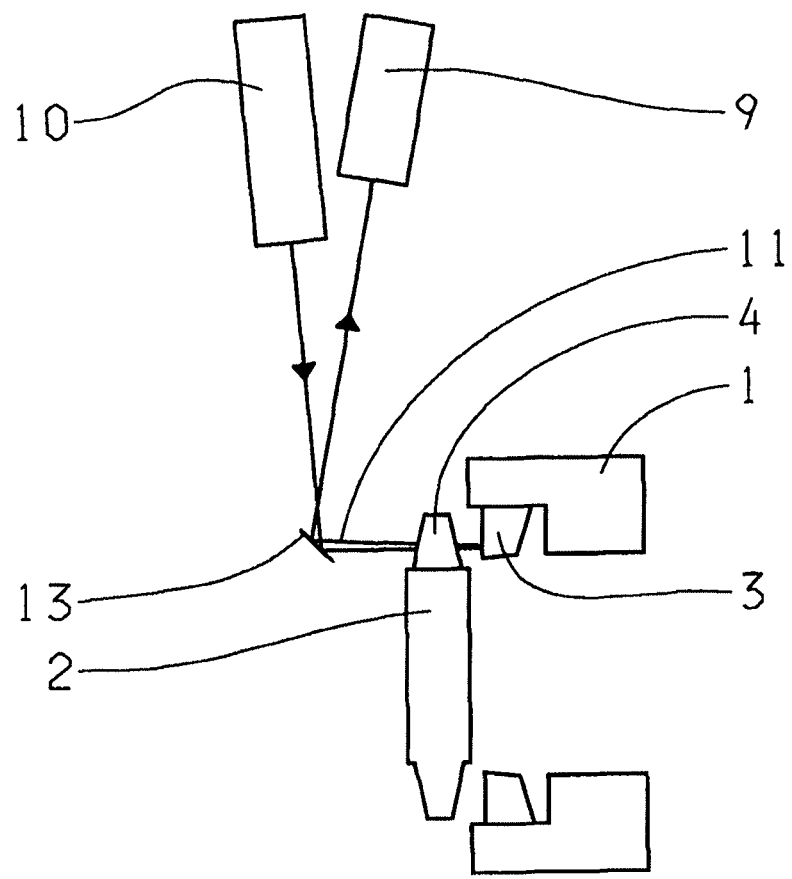
FIG. 3: A schematic view of the claw shifting device according to the invention with an optical sensor as the detection device.
Figure 4:
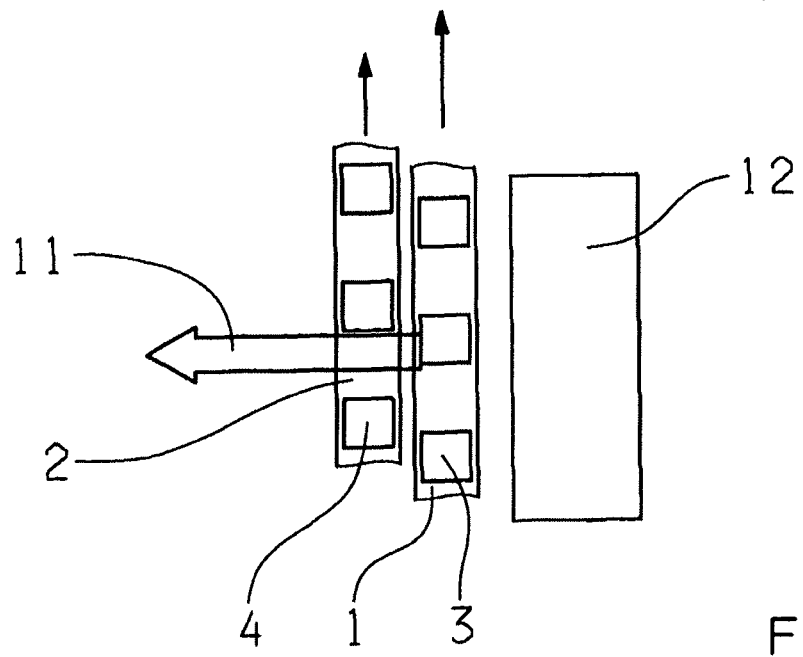
FIG. 4: Another schematic view of the claw shifting device according to the invention, as in FIG. 3.

FIGS. 3 and 4 show another possible embodiment variant of the invention, in which an optical sensor 9 with a light source 10 is used as the detection device. The light source 10 is arranged in such manner that a light beam 11 traveling at least in part in the engagement direction in the area of the claws 3, 4 is emitted, such that the claws 4 at the front of the shifting sleeve or second clutch element 2 are made light-absorbing, or matt, while the rear claws 3 of the first clutch element 1 are made light-reflecting. Preferably, a possible background 12 is also made light-absorbing. When the width of the light beam 11 corresponds approximately to the width of a claw 3, 4 plus the width of a gap, then with reference to the summed, reflected light beam 11 the optical sensor 9 can recognize when there is a position offset between the claws 3, 4 of the two clutch elements 1, 2. The path of the light beam 11 is varied appropriately by a mirror 13. The speed difference between the clutch elements 1, 2 can be derived from their relative positions.

Figure 5:
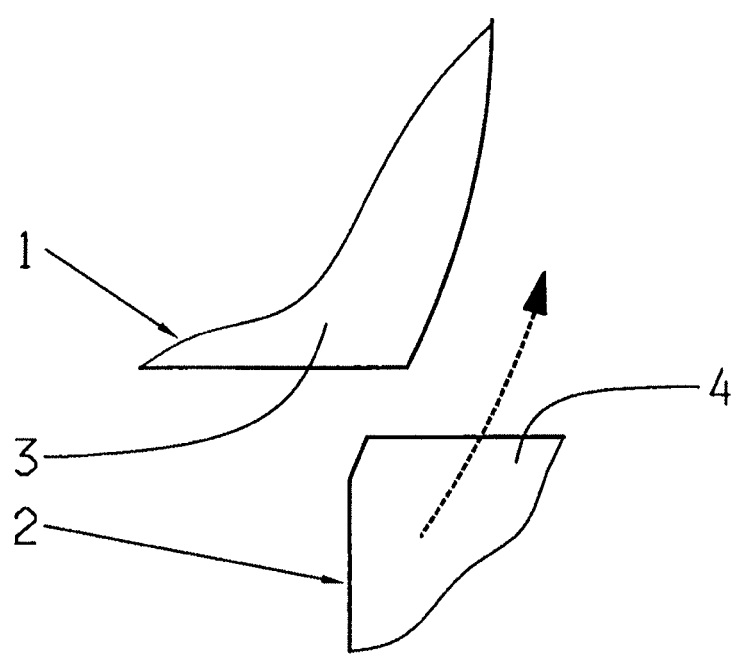
FIG. 5: A schematic view of a modified claw geometry for a claw shifting device.

FIG. 5 shows a geometrical design of the claw contact geometry, which is intended to improve the engagement behavior. For this, at least the contact surfaces of the claws 3, 4 are correspondingly rounded so that the claw geometry approximately reflects the ballistic path of the relative movement of the second clutch element 2 or shifting sleeve during a successful engagement, this relative movement of the second, axially displaceable clutch element 2 during the engagement process being indicated by an arrow in FIG. 5, Thanks to the claw geometry chosen, if there is any deviation from the optimum path during engagement only slight, or even no impacts occur between the clutch elements 1, 2.

INDEXES

1 First clutch element
2 Second clutch element
3 Claws of the first clutch element
4 Claws of the second clutch element
5 Hall sensor
6 Hall sensor
7 Evaluation unit
8 Hall sensor
9 Optical sensor
10 Light source
11 Light beam
12 Background
13 Mirror

The invention claimed is:

1. A positively interlocking shifting device for a vehicle transmission, the positively interlocking shifting device comprising:
    at least a first rotating clutch element (1) and a second, rotating and axially displaceable clutch element (2), for the interlocking engagement of corresponding claws (3, 4) of the first and the second clutch elements (1, 2);
    the axially displaceable clutch element (2) being shifted as soon as a speed difference, between the first and the second clutch elements (1, 2) reaches a predetermined value;
    at least one detection device being provided for detecting a position offset between the corresponding claws (3, 4) of the first and the second clutch elements (1, 2), engagement of the first and the second clutch elements commencing when only the speed difference reaches the predetermined value and the position offset precludes a tooth-on-tooth position of the corresponding claws.

2. The shifting device according to claim 1, wherein the detection device is at least one Hall sensor such that an alternating current fraction of signals, emitted by the Hall sensor, serves as a measure of overlap of the claws (3, 4).

3. The shifting device according to claim 1, wherein the detection device is an optical sensor (9) with a light source (10).

4. The shifting device according to claim 1, wherein the detection device determines the speed difference from relative positions of the claws (3, 4) detected.

5. The shifting device according to claim 1, wherein at least partially, the corresponding contact surfaces of the claws (3, 4) are rounded such that the rounded shape copies a path of relative movement of the second clutch element (2) during engagement.

6. A positively interlocking shifting device for a vehicle transmission, the positively interlocking shifting device comprising:
    at least a first rotating clutch element (1) and a second, rotating and axially displaceable clutch element (2), for the interlocking engagement of corresponding claws (3, 4) of the first and the second clutch elements (1, 2);

the axially displaceable clutch element (2) being shifted as soon a predetermined speed difference, between the first and the second clutch elements (1, 2) is reached;

at least one detection device being provided for detecting a position offset between that corresponding claws (3, 4) of the first and the second clutch elements (1, 2), as required for engagement;

the detection device is an optical sensor (9) with a light source (10); and the light source (10) is arranged so that a light beam (11), which travels at least in part in an engagement direction in an area of the claws (3, 4), is emitted, and claws (4) at a front of the second clutch element (2) are light-absorbing while rear claws (3) of the first clutch element (1) are light-reflecting.

7. The shifting device according to claim 6, wherein a width of the emitted light beam (11) corresponds to a width of a claw (3, 4) plus a width of a gap between two adjacent claws (3, 4) of one of the first and the second clutch elements (1, 2).

8. The shifting device according to claim 6, wherein reflected light beam (11) is summed by the optical sensor.

9. The shifting device according to claim 6, wherein a path of the light beam (11) is varied by at least one mirror (13).

10. A positively interlocking shifting device for a vehicle transmission, the shifting device comprising:

first and second clutch elements being engageable with one another, and each of the first and the second clutch elements comprising a plurality of claws and being rotatable;

the second clutch element being axially displaceable when a difference in a rotational speed of the first clutch element and a rotational speed of the second clutch element is equal to a predetermined rotational speed difference; and a detection device for detecting a positional offset between the claws of the first clutch element and the claws of the second clutch element, and the positional offset being required for engagement of the claws of the first and the second clutch elements; and commencing engagement of the first and the second clutch elements when only the difference of the rotational speeds of the first and second clutch elements equals the predetermined value and the positional offset between the claws of the first and the second clutch elements precludes a tooth-on-tooth position of the corresponding claws.

11. The shifting device according to claim 10, wherein the at least one detection device is only one hall sensor that is common to both of the first and the second clutch elements and which detects the position offset between the corresponding claws of the first and the second clutch elements.

12. The shifting device according to claim 10, wherein the at least one detection device comprises a light source and a light sensor, the light source is arranged to emit a light beam that is directed initially at the claws of the first clutch element and subsequently at the claws of the second clutch elements, the claws of the first clutch element are light-absorbent and the claws of the second clutch element are light-reflecting.

* * * * *